(12) United States Patent
Lohr et al.

(10) Patent No.: US 12,042,697 B2
(45) Date of Patent: Jul. 23, 2024

(54) MOTION CAPTURE SYSTEM THAT RECOGNIZES USAGE CONTEXT

(71) Applicant: Blast Motion Inc., San Marcos, CA (US)

(72) Inventors: Scott Lohr, Carlsbad, CA (US); Bhaskar Bose, San Marcos, CA (US)

(73) Assignee: Blast Motion Inc., San Marcos, CA (US)

( * ) Notice: Subject to any disclaimer, the term of this patent is extended or adjusted under 35 U.S.C. 154(b) by 0 days.

(21) Appl. No.: 17/893,119

(22) Filed: Aug. 22, 2022

(65) Prior Publication Data
US 2024/0058647 A1 Feb. 22, 2024

(51) Int. Cl.
*A63B 24/00* (2006.01)
*A63B 69/00* (2006.01)
*A63B 71/06* (2006.01)
*H04W 4/06* (2009.01)
(Continued)

(52) U.S. Cl.
CPC ...... *A63B 24/0003* (2013.01); *A63B 69/0002* (2013.01); *A63B 71/0622* (2013.01); *H04W 4/06* (2013.01); *H04W 4/80* (2018.02); *A63B 2024/0071* (2013.01); *A63B 2069/0008* (2013.01); *A63B 2102/18* (2015.10); *A63B 2220/44* (2013.01); *A63B 2220/833* (2013.01); *A63B 2225/54* (2013.01)

(58) Field of Classification Search
CPC ............ A63B 24/0003; A63B 69/0002; A63B 71/0622; A63B 2024/0071; A63B 2069/0008; A63B 2102/18; A63B 2220/44; A63B 2220/833; A63B 2225/54; H04W 4/06; H04W 4/80
See application file for complete search history.

(56) References Cited

U.S. PATENT DOCUMENTS 9,396,385 B2 * 7/2016 Bentley ............... G11B 27/17
9,401,178 B2 * 7/2016 Bentley ............... G11B 27/031
9,619,891 B2 * 4/2017 Bose ................... A63F 13/65
(Continued)

OTHER PUBLICATIONS

International Search Report issued in PCT/US2023/072613 on Oct. 13, 2023 (3 pages).

*Primary Examiner* — Jack Yip
(74) *Attorney, Agent, or Firm* — ARC IP Law, PC; Joseph J. Mayo

(57) ABSTRACT

A system that captures and analyzes motion data for equipment and that automatically captures the usage context in which the motion occurs. Context items in the environment may have attached beacons that broadcast their identities; a motion capture element on the equipment receives and analyzes these broadcast messages to determine which context items are nearby. Beacons may be grouped into categories such as "user", "location", "coach", and "equipment"; the motion capture element determines the nearest beacon in each category, and these nearest beacons are used as the context for each motion. For example, in a baseball application players and coaches may wear pendants or similar accessories with personal beacons, and other beacons may be installed into bats, bases, batting cages, bullpens, or other locations. The context for a swing may include the player who made the swing, the bat used, a coach that was present, and where the swing occurred.

11 Claims, 5 Drawing Sheets

(51) Int. Cl.
*H04W 4/80* (2018.01)
*A63B 102/18* (2015.01)

(56) References Cited

U.S. PATENT DOCUMENTS

| | | |
|---|---|---|
| 10,755,466 B2 * | 8/2020 | Chamdani ............. A63F 13/212 |
| 10,987,542 B2 * | 4/2021 | Nejezchleb ........ A63B 24/0006 |
| 2016/0292881 A1 * | 10/2016 | Bose ....................... G11B 27/10 |
| 2020/0074408 A1 * | 3/2020 | Binder ............... G06Q 10/1093 |
| 2020/0320441 A1 * | 10/2020 | Bates .................. G06F 16/9537 |
| 2021/0174268 A1 * | 6/2021 | Levinson ............... G06Q 50/10 |

\* cited by examiner

MOTION CAPTURE SYSTEM THAT RECOGNIZES USAGE CONTEXT

BACKGROUND OF THE INVENTION

Field of the Invention

One or more embodiments setting forth the ideas described throughout this disclosure pertain to the field of motion capture sensors and analysis of motion capture data. More particularly, but not by way of limitation, one or more aspects of the invention enable a motion capture system that recognizes usage context.

Description of the Related Art

Motion capture devices with inertial motion sensors are increasingly used to analyze movements such as the swing of a baseball bat or golf club, or motions of other sporting or non-sporting equipment. Analysis of motion sensor data provides insights into the performance of equipment users, and may be used for training, evaluation, recruiting, and feedback.

Existing motion capture devices known in the art typically transmit only the motion data that they measure with their sensors. Associating this motion data with any other tags, such as the user who performed the motion, the place the motion occurred, or the type of equipment that was used, is generally performed manually after the motion data is received. This process of associating the motion data with the contextual information that describes where and how the motion occurred is time-consuming and error prone. There are no known motion capture systems that automatically detect relevant features of the usage context for a motion and that transmit this context data along with the motion sensor data.

For at least the limitations described above there is a need for a motion capture system that recognizes usage context.

BRIEF SUMMARY OF THE INVENTION

Embodiments of the invention enable a motion capture system that recognizes usage context. Items in the environment are equipped with beacons that transmit their identities to a motion capture element, allowing the motion capture element to determine the usage context in which a motion occurs.

One or more embodiments of the invention include a motion capture element that is configured to be coupled to a piece of equipment, and a motion analysis element that receives motion data from the motion capture element. The motion capture element may have a processor, one or more motion sensors coupled to the processor, and a network interface coupled to the processor. The motion capture element may be configured to receive broadcast messages from one or more beacons. Beacons may include one or more of: user beacons coupled to users, location beacons coupled to locations, and coach beacons coupled to coaches. The motion capture element may capture motion sensor data from the motion sensors during a movement of the piece of equipment. It may also analyze the broadcast messages to determine the context of the movement. The context may include one or more of a user who performs the movement, a location at or near the equipment when the movement occurs, and a coach at or near the equipment when the movement occurs. The motion capture element may transmit the motion sensor data and the context over the network interface to the motion analysis element. The motion analysis element receives the sensor data and context over its network interface, and it analyzes the sensor data with a processor to form one or more motion metrics that it associates with the context.

In one or more embodiments, the motion capture system does not require manual input to configure the motion capture element with any of the user, the location, or the coach.

In one or more embodiments, the network interface of the motion capture element may include a Bluetooth interface, and the beacons may be Bluetooth beacons that broadcast Bluetooth advertising messages.

In one or more embodiments, the motion sensors may include a three-axis accelerometer and a three-axis gyroscope.

In one or more embodiments, the motion capture element may partition broadcast messages into groups that include a user group, a location group, and a coach group. The context may be determined as the identity of the closest beacon in each nonempty group. Broadcast messages may for example include a group identifier that is used for partitioning the broadcast messages into groups.

In one or more embodiments, the beacons may include equipment beacons that are coupled to pieces of equipment, and the context of a motion may include the piece of equipment that performs the motion. The motion capture system may not require manual input to configure the motion capture element with the piece of equipment.

One or more embodiments may include a motion database coupled to the processor of the motion analysis element. The motion analysis element may store the motion metrics and the associated context in the database. The database may accept a query comprising one or more context conditions and return a set of motion metrics associated with corresponding context that satisfies the context conditions.

In one or more embodiments, beacons may include user beacons, location beacons, and coach beacons, and the context may include the user, the location, and the coach. One or more embodiments may further include equipment beacons, and the context may further include the piece of equipment.

BRIEF DESCRIPTION OF THE DRAWINGS

The above and other aspects, features and advantages of the ideas conveyed through this disclosure will be more apparent from the following more particular description thereof, presented in conjunction with the following drawings wherein.

DETAILED DESCRIPTION OF THE INVENTION

A motion capture system that recognizes usage context will now be described. In the following exemplary description numerous specific details are set forth in order to provide a more thorough understanding of the ideas described throughout this specification. It will be apparent, however, to an artisan of ordinary skill that embodiments of ideas described herein may be practiced without incorporating all aspects of the specific details described herein. In other instances, specific aspects well known to those of ordinary skill in the art have not been described in detail so as not to obscure the disclosure. Readers should note that although examples of the innovative concepts are set forth throughout this disclosure, the claims, and the full scope of any equivalents, are what define the invention.

One or more embodiments of the motion capture system may be used to capture data that describes the motion of a piece of equipment. One or more embodiments may be used with any equipment used for any purpose; for example, without limitation, equipment may be a personal or industrial tool, a machine, an appliance, a medical device, a weapon, an article of clothing, an accessory, or a vehicle. A piece of equipment may also be a piece of sporting equipment used for any type of sport, such as for example, without limitation, a baseball bat, softball bat, cricket bat, tennis racket, lacrosse stick, or golf club. The examples below show illustrative applications of a motion capture system for baseball bat swings; similar components may be used for motion capture in any sporting or non-sporting application.

In many applications it may be useful to capture motion data along with contextual information that describes the environment in which the motion occurs. In many motion capture applications in the prior art, context data is often added manually to motion capture data after the fact, or a motion capture system must be manually configured with context data prior to motion capture. These methods of manually adding context data are time-consuming and error prone. One or more embodiments of the invention may automatically capture usage context information for a motion using beacons attached to relevant contextual items that are at or near the equipment that is moved. In baseball for example, the relevant context for a swing of a bat may include the player performing the swing, the location of the swing, and other people near the bat when the swing occurs. These context examples are illustrative; one or more embodiments of the invention may capture data on any type of usage context for any type of motion.

Figure 1:
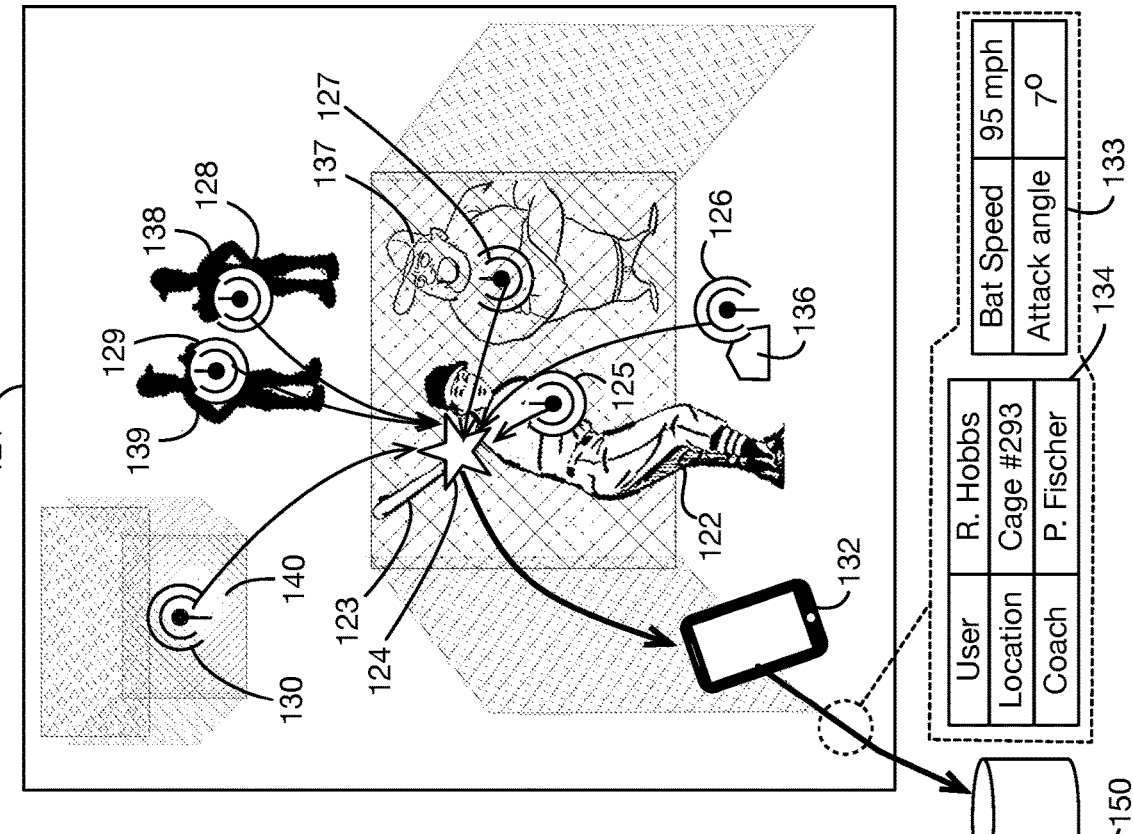
FIG. 1 shows two illustrative scenarios with motion capture elements coupled to baseball bats, where the motion capture elements receive broadcast messages from nearby beacons that indicate the context within which each bat is used.
Figure 1:
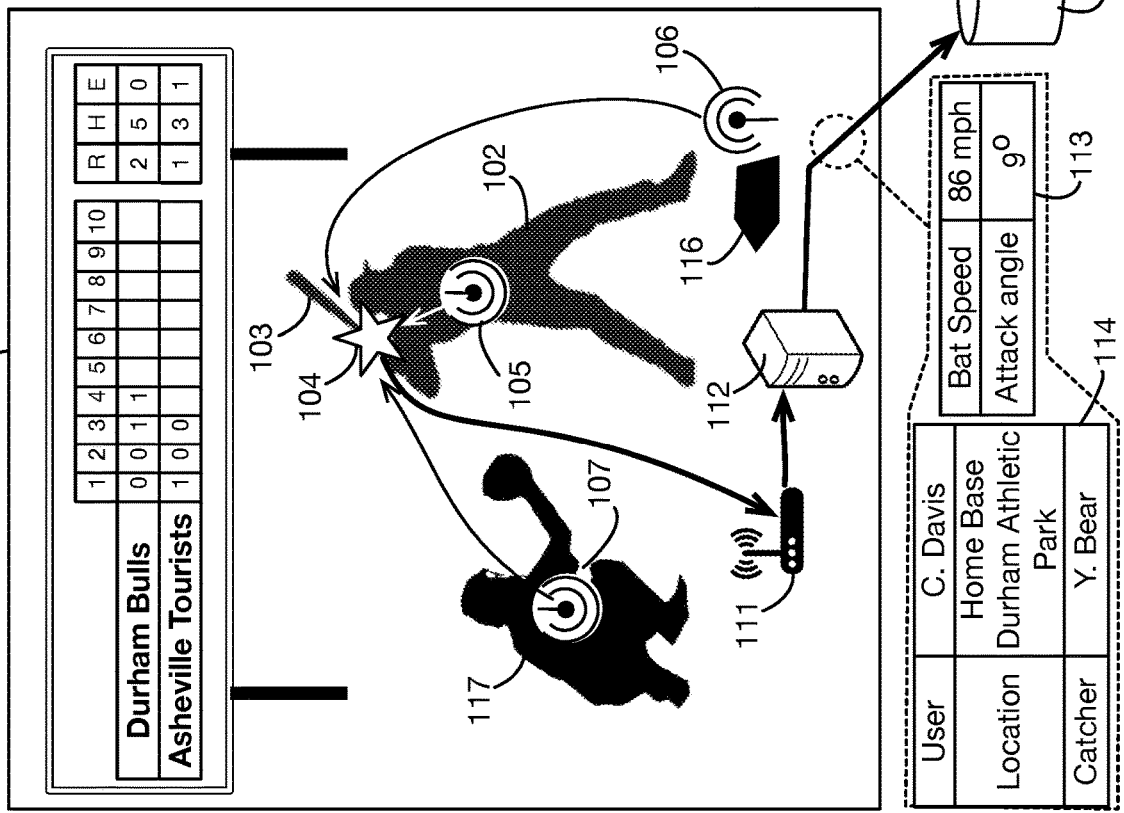

FIG. 1 shows an illustrative embodiment of a motion capture system for baseball swings, with two scenarios 101 and 121 for swings captured in two different usage contexts. In each scenario, a user swings a baseball bat with an attached motion capture element that contains one or more motion sensors. The motion sensors may be for example inertial motion sensors, as described below with respect to FIG. 2; one or more embodiments may use any type or types of sensors to measure the motion of equipment. Sensors may capture motion data at any frequency, such as for example at 1000 Hz, 500 Hz, or 200 Hz. In scenario 101, user (player) 102 swings bat 103 that has an attached motion capture element 104 (shown as a star icon); in scenario 121, user (player) 122 swings bat 123 that has an attached motion capture element 124 (also shown as a star icon). The motion capture elements 104 and 124 may transmit the sensor data they capture during swings of their attached equipment to one or more motion analysis elements, which may analyze the motion data in any desired manner. In one or more embodiments, the motion capture elements may perform some or all of the motion analysis themselves. In scenario 101, motion capture element 104 on bat 103 transmits data to motion analysis element 112, which is a server connected via a wireless gateway 111; server 112 may then analyze the motion data to generate one or more motion metrics that describe the swing. In scenario 121, motion capture element 124 on bat 123 transmits data wirelessly to a motion analysis element 132, such as a mobile phone or a tablet, and device 132 analyzes the motion data to form one or more swing metrics. In one or more embodiments of the invention, a motion capture element may transmit data via any type or types of network connection to any type or types of motion analysis elements that may analyze the data to calculate any desired metrics describing the motions captured by the capture element. The motion analysis element or elements may contain any type or types of processors, such as for example, without limitation, a microprocessor, a microcontroller, a laptop computer, a notebook computer, a desktop computer, a tablet, a server, a CPU, a GPU, an ASIC, or a network of any of these devices.

The motion capture elements 104 and 124 also capture the usage context for the recorded swings. Context items are equipped with beacons, such as Bluetooth beacons for example, that broadcast messages with their identities; the motion capture elements receive and process these broadcast messages to determine the usage context. In these scenarios, the usage context includes the identity of the equipment user (the baseball player) who performs the swing. By determining automatically who is using a piece of equipment, the motion data and swing metrics may be associated with the appropriate user, even when two or more users share the same equipment. For example, in a baseball application, a team may have a stock of bats each of which is equipped with a motion capture element, and any player may select any bat at any time; the data for each swing of each bat will automatically be associated with the player who performs each swing. This capability represents a significant advance over the prior art, where players must always use their own personal bat, or motion capture elements must be reconfigured with a player identity whenever a bat is used by a different player.

In the embodiment shown in FIG. 1, user (player) identities are determined based on beacons carried by or worn by the users. For example, user 102 wears a beacon 105, and user 122 wears a beacon 125. In one or more embodiments the user beacons may be embedded into any type of accessory or article of clothing, such as a pendant, "dog tag", id bracelet, watch, armband, belt, cap, or insignia. Each beacon may have an associated unique identifier. The unique identifier of a user beacon may be associated with the user. The messages broadcast from the beacons may include the beacon unique identifier. Broadcast messages from beacon 105 are received by motion capture element 104, which allows motion capture element 104 to identify the user 102 who is part of the usage contact for swings of bat 103. Similarly broadcast messages from beacon 125 are received by motion capture element 124, which allows motion capture element 124 to identify the user 122 who is part of the usage context for swings of bat 123.

The usage context for a motion of a piece of equipment may also include the location at or near which the motion occurs. In scenario 101, the swings of bat 103 are performed in a competitive game in a ballpark, while in scenario 121 the swings of bat 123 are performed during practice in a batting cage. To differentiate between these usage contexts, one or more embodiments may use beacons that are installed at specific known locations. For example, beacon 106 is installed in or near home plate 116 of the ballpark, and beacon 126 is installed in or near the practice base 136 in the batting cage. Broadcast messages from beacon 106 are received by motion capture element 104, which lets motion capture element 104 identify that the swings of bat 103 occur in the ballpark; similarly broadcast messages from beacon 126 are received by motion capture element 124, which lets motion capture element 124 identify that the swings of bat 123 occur in the batting cage. In one or more embodiments, location beacons may be installed in or near any desired landmarks such as bases, pitching mounds, bullpens, batting cages, training fields or facilities, goals, sidelines, and zones of playing fields and stadiums. Location beacons may also be installed in gateways such as gateway 111. A location beacon may also be temporarily placed in any location during any event.

In one or more embodiments, usage context may include the identity of one or more persons other than the equipment user who may be in the vicinity when the user moves the equipment. The specific types of persons of interest may depend on the application and the context. For example, in scenario 121, a batting coach 137 may be observing and coaching user 122 while the user takes practice swings. The usage context for practice swings may therefore include the identity of the coach 137. In scenario 101, the usage context may include nearby coaches, and may also include the identity of other nearby players. For example, catcher 117 is catching pitches thrown to user 102, so the usage context may include the identity of the catcher 117. (The context may also include the identity of other players such as the pitcher, fielders, or runners on base.) Persons of interest in sporting applications may include for example any players, coaches, trainers, staff, opponents, observers, scouts, referees, officials, journalists, analysts, or spectators.

As for users, coaches or other players, or any other persons of interest, may be equipped with beacons that broadcast the person's identity. For example, coach 137 is equipped with beacon 127, and catcher 117 is equipped with beacon 107. Broadcast messages from beacon 137 are received by motion capture element 124, and broadcast messages from beacon 107 are received by motion capture element 104.

Since beacons typically broadcast messages to any listening devices within range, in some scenarios a motion capture element may receive broadcast messages from different sources of the same type. This situation is illustrated in scenario 121 where in addition to coach 137, other coaches 138 and 139 are near the batting cage when user 122 is practicing. These other coaches 138 and 139 may also be equipped with beacons 128 and 129, respectively; broadcast messages from beacons 128 and 129 may reach motion capture element 124 along with broadcast messages from beacon 127. In one or more embodiments it may be useful for the context to include any and all coaches (or similar personnel) within range; however, in some situations it may be preferable to select a specific coach to associate with a swing. In scenario 121, as described further below, this selection may use the estimated distance between the motion capture element 124 and the transmitting beacon to select the nearest coach beacon 127; this procedure associates the closest coach with the swing since that is the coach who is most likely coaching the user at that time. Similarly, a motion capture element may receive broadcast messages from multiple users and multiple locations, and it may select the closest beacon of each type to form the usage context. For example, motion capture element 124 may receive broadcast messages from a location beacon 130 in a nearby batting cage 140, but it may select beacon 126 for the usage context location since it is closer.

Motion analysis elements 112 and 132 may receive sensor data and context information (obtained from beacons) from motion capture elements 104 and 124, respectively. The motion analysis elements may analyze the sensor data to calculate one or more metrics that describe the motion of the equipment attached to the motion capture element. Illustrative metrics may include for example, without limitation, trajectories, speeds, angles, power, accelerations, rotational velocities or accelerations, distances traveled, and timing of various phases of equipment movement. Metrics may include peak values of any of these measures, average values, changes in values, rates of change of any values, and ratios of any measures to any other measures. Any information that describes any aspect of the equipment motion, or of the movements of the user that generate the equipment motion, may be used as a metric. In one or more embodiments a motion analysis element may also analyze context data to determine one or more metrics. FIG. 1 illustrates two metrics that may be applicable to baseball swings: the speed of the bat when it impacts the ball, and the attack angle (the angle of the bat's velocity vector to the horizontal plane) when it impacts the ball. Motion analysis element 112 calculates these metrics 113 for a swing captured by motion capture element 104, and motion analysis element 132 calculates these metrics 133 for a swing captured by motion capture element 124. These metrics are for illustration and any embodiment may use any desired metrics. Because the context of each swing is also captured by the motion capture elements, the context data may be associated with the calculated swing metrics. For example, in one or more embodiments the swing metrics may be stored in a motion database 150 along with the context data associated with each swing. Associating the metrics with the context data supports subsequent analysis of data in motion database 150 based on context, as described below; for example, metrics may be retrieved and compared based on factors such as the user, the location, and the coach. In scenario 101, context 114 is stored with metrics 113; this context includes the user 102, the location 116, and the catcher 117. Similarly in scenario 121, context 134 is stored with metrics 133; this context includes the user 122, the location 136, and the coach 137.

Figure 2:
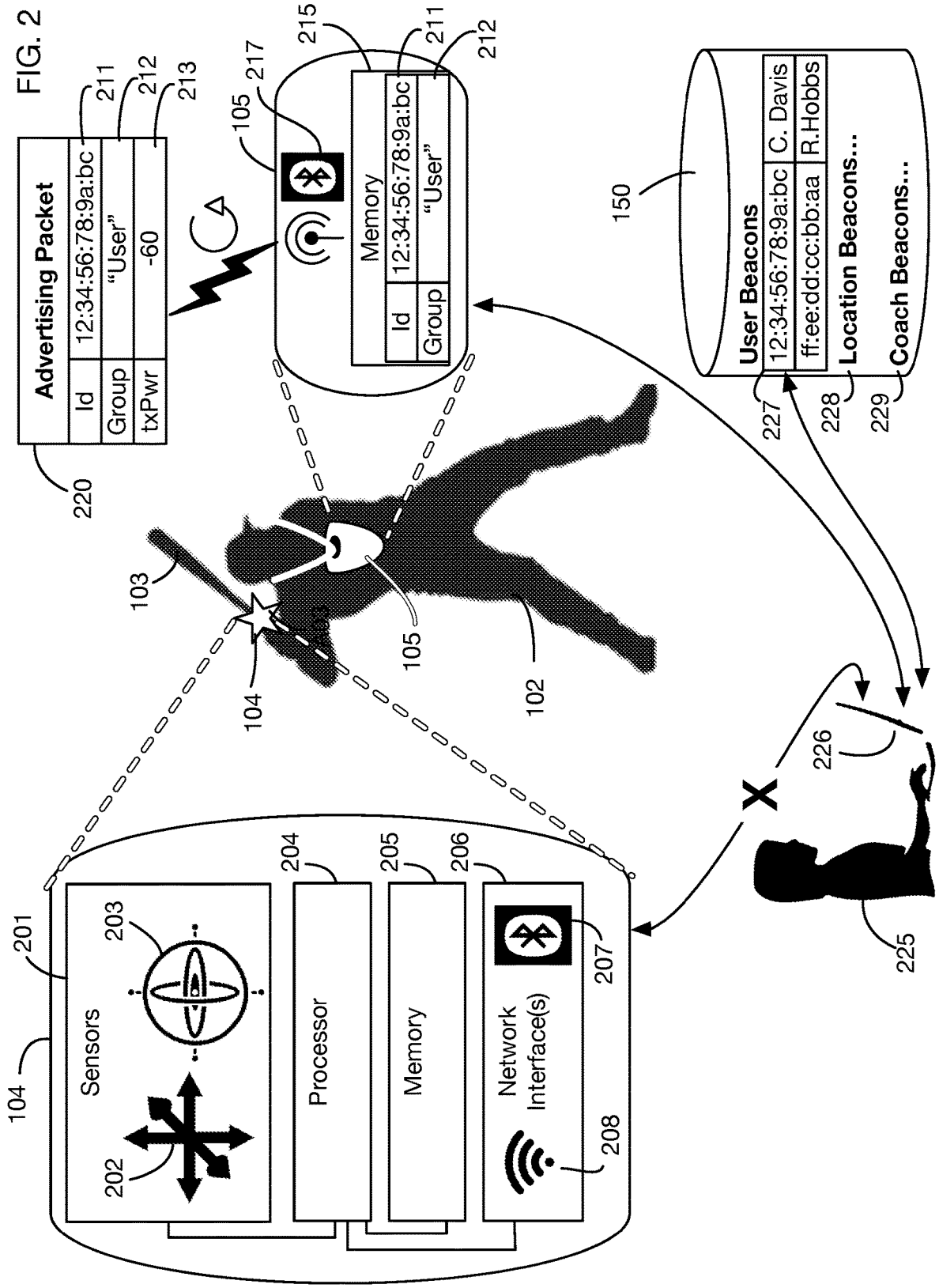
FIG. 2 shows illustrative components of an embodiment of a motion capture element and of an embodiment of a beacon, and it illustrates that manual configuration of the motion capture element with the context is unnecessary since context data is received from beacons.

FIG. 2 shows components of an illustrative motion capture element 104 and of an illustrative beacon 105. Motion capture element 104 may for example contain one or more motion sensors 201, a processor 204, memory 205, and one or more network interfaces 206. Motion sensors 201 may include any device that measures any aspect of the position or orientation of the motion capture element, or of any changes in the position or orientation. In one or more embodiments motion sensors 201 may include inertial motion sensors such as a three-axis accelerometer 202 and a three-axis rate gyroscope 203. One or more embodiments of a motion capture element may include any other sensors such as for example, without limitation, a magnetometer, a GPS, a rangefinder, a pressure sensor, an air flow sensor, or a force sensor. Processor 204 may be for example a microcontroller, a microprocessor, an ASIC, a CPU, a GPU, or any other type of processing device. Memory 205 may include any type of volatile or nonvolatile memory; the memory may store data such as an identifier for the motion capture element and cached motion capture data received from sensors but not yet transferred to a motion analysis element. Network interface(s) 206 may for example include any wireless network interfaces such as Bluetooth (including Bluetooth Low Energy) 207 and Wi-Fi 208; one or more embodiments may instead or in addition support any wired network interfaces.

Motion capture element 104 may be coupled to equipment 103 in any location or locations and in any desired manner. In one or more embodiments it may be possible to decouple the motion capture element from the equipment and couple it to a different piece of equipment; an example of associating equipment with motion capture elements is described below with respect to FIG. 5.

Illustrative beacon 105 is a user beacon that is worn by, attached to, or carried by user 102. In this illustrative embodiment beacon 105 is worn as a pendant by the user; in one or more embodiments a user beacon may be integrated into or attached to any item associated with the user, such as an article of clothing or an accessory. Beacon 105 contains a network interface, which may be for example a Bluetooth interface 217. Beacons may broadcast messages using any type or types of network interfaces. Beacon 105 also has a memory 215, which may contain a unique identifier 211 of the beacon. In one or more embodiments a beacon may also be configured with a group identifier 212 that identifies the type of beacon. Beacons may be assigned to groups that depend on the specific application. In the baseball application illustrated in FIGS. 1 and 2, illustrative beacon groups may be for example a "user" group for user beacons, a "location" group for location beacons, a "coach" group for beacons assigned to coaches or trainers or any other person observing or assisting the user, and a "player" group for beacons associated with players other than the user. These groups may be used to determine the context, with at most one beacon per group included in each context. In the embodiment shown in FIG. 2, the beacon group identifier 212 is stored separately in the beacon memory. In one or more embodiments the beacon group may be embedded into the beacon unique identifier; for example, the unique identifier may consist of a prefix that encodes the group and a suffix that is unique within the group.

Beacon 105, like other beacons, periodically broadcasts a message 220 with its identity. Illustrative message 220 contains the beacon unique identifier 211 and the group identifier 212. It may also contain information 213 about the transmission power, which helps receivers estimate their distance to the beacon. In one or more embodiments, beacon messages may contain any other desired information. For embodiments that use Bluetooth Low Energy beacons, the messages 220 may be Bluetooth advertising messages that advertise the presence of a device.

FIG. 2 also illustrates tasks that may be performed by an administrator 225 to configure selected elements of the system. The administrator may be any person or persons, including the user of a motion capture element or of a beacon. An administrator may use a system 226 such as a laptop or mobile device to configure the system; in one or more embodiments this system may also serve as a motion analysis element. An illustrative configuration tasks is to associate beacon identifiers with the names of the items the beacons are associated with. For example, motion database 150 (or another database) may contain a table 227 that maps between beacon unique identifiers and user names. Similar tables may provide mappings for unique identifiers of other beacon types, such as table 228 for location beacons and table 229 for coach beacons. In one or more embodiments the associations between beacon identifiers and common names may be stored in the beacons themselves and may be included in messages 220.

FIG. 2 also illustrates a configuration step that is not required in one or more embodiments of the invention. Specifically, it is not generally required to configure motion capture element 104 with any of the elements of context that are obtained from beacons. It is not generally required to configure element 104 with the identity of the user 102, since this information is obtained dynamically from beacon 105 when a motion is captured. Similarly, it is not required to configure element 104 with other context data such as location or coach. It is also not necessary to manually add this association between captured motions with metrics and the context of the motions to motion database 150, since the context data captured by the motion capture element is available automatically. One or more embodiments of the invention therefore do not include (and do not require) an administrative interface to configure motion capture elements or captured motion data with context information that is available from beacons, such as the user of equipment, the location of equipment when a motion is captured, or a coach or similar person near the equipment when a motion is captured.

Figure 3:
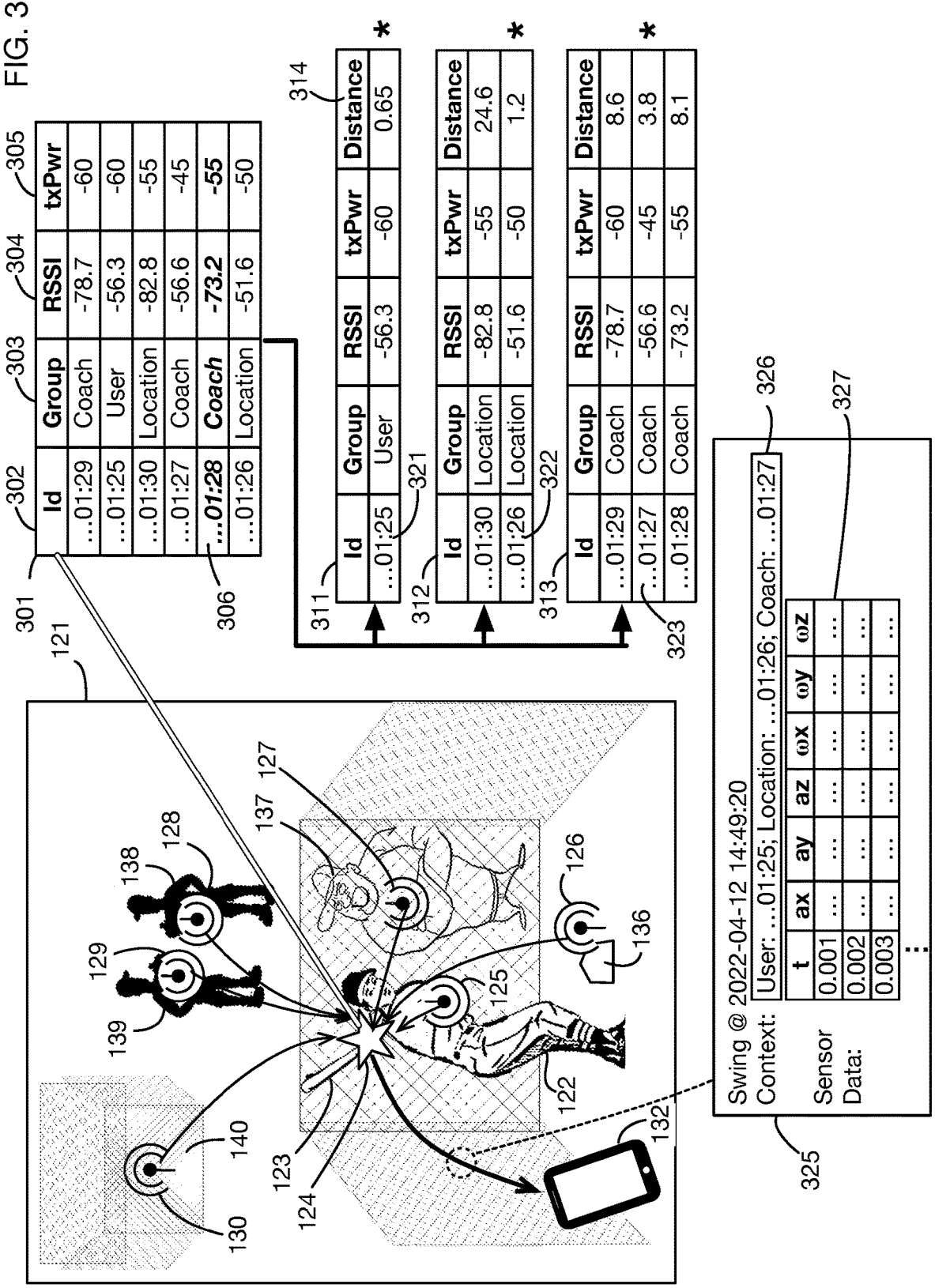
FIG. 3 shows an illustrative method that may be used to determine context when there are multiple beacons of the same type within range.

FIG. 3 shows details of an illustrative method used to determine usage context for the scenario 121. Motion capture element 124 receives messages 301 from beacons in the vicinity, which include beacons 125, 126, 127, 128, 129, and 130. These beacon messages 301 are received in no particular order. Each beacon message contains the beacon unique identifier 302, the beacon group identifier 303, a received signal strength indicator (RSSI) 304 (generated by the receiving network interface), and a power value 305 that is related to the strength of the beacon. (The txPwr value 305 may for example represent the received signal strength at one meter from the beacon.) The RSSI 304 and power value 305 may be used to estimate the distance between the beacon and the receiving motion capture element.

As a first processing step to determine the usage context, the processor of motion capture element 124 partitions the messages 301 based on the group identifier 303 of each message, resulting in user beacon messages 311, location beacon messages 312, and coach beacon messages 313. For each message, a distance 314 is calculated between the motion capture element and the beacon. This calculation may be directly available from a message API, or it may be calculated from the RSSI 304 and power value 305 using methods known in the art. Within each group, the message associated with the smallest distance is selected to form the usage context. Thus beacon identifier 321 is selected for the user, beacon identifier 322 is selected for the location, and beacon identifier 323 is selected for the coach; these identifiers are associated with user 122, location 136, and coach 137, respectively. Data 325 transmitted from the motion capture element 124 to motion analysis element 132 includes sensor data 327 captured throughout a swing, and the context 326 with the identifiers of the closest beacons in each beacon group.

Figure 4:
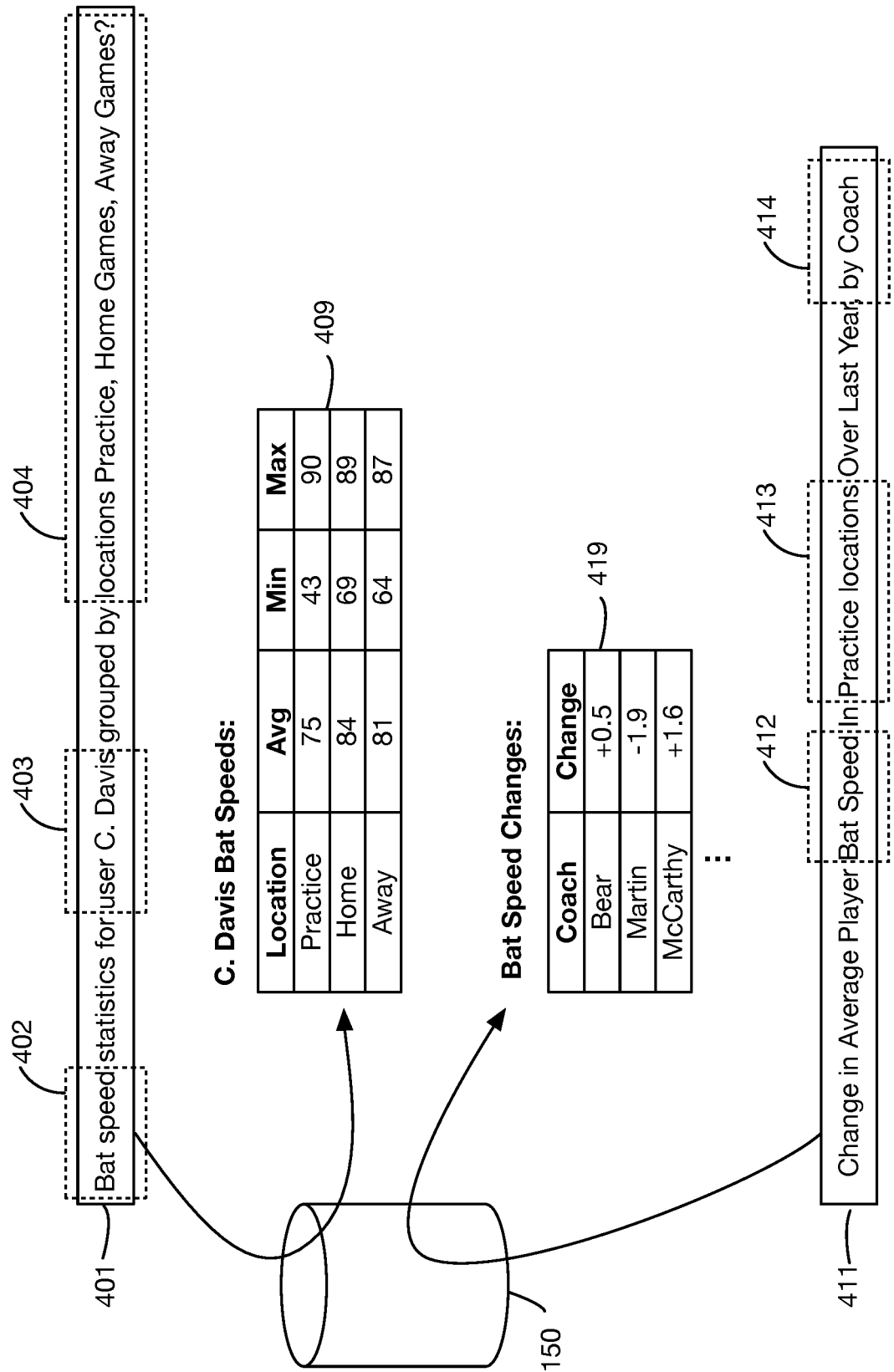
FIG. 4 shows illustrative database queries that apply conditions on the context associated with stored motion metrics.

As described above with respect to FIG. 1, one or more embodiments may store motion metrics with the associated context data in motion database 150, thereby enabling queries and analyses that are based on context information. FIG. 4 shows two illustrative queries 401 and 411 of motion database 150 that retrieve data based on contextual conditions and constraints, with results 409 and 419, respectively, returned from the database. The queries 401 and 411 are written in an informal language for illustration; in practice a structured language such as SQL may be used. Illustrative query 401 retrieves metric 402 for database entries that satisfy context conditions 403 (user equal to "C. Davis") and 404 (locations grouped by practice, home, and away). For the location portion of the query, there may be a secondary table that for example classifies locations into the groups practice, home, and away. This query 401 may be used for example to determine whether the user performs better in practice or during competition in home games or away games. Illustrative query 411 retrieves metric 412 for locations 413 classified as "practice", grouped by the coach 414 that was present. This query 411 may be used for example to determine which coach has most increased the performance of the players he or she coaches. These examples are illustrative; one or more embodiments may enable queries and analyses of any metrics using any conditions, constraints, or groupings on any contextual data stored with the metrics.

Figure 5:
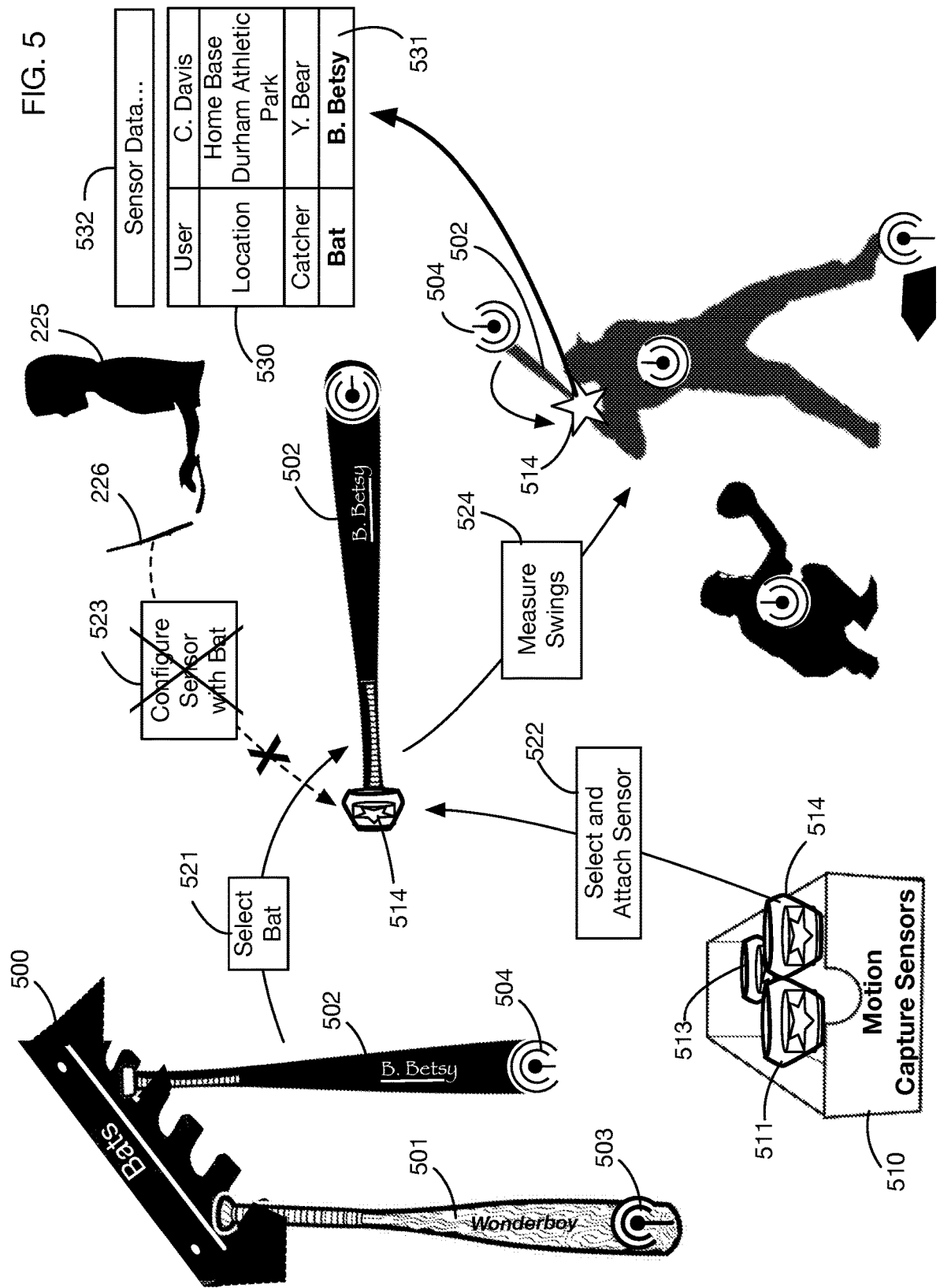
FIG. 5 shows an illustrative embodiment that determines what equipment a motion capture element is attached to using a beacon on the equipment.

In some embodiments, a motion capture element may be associated permanently or over a long period of time with a specific piece of equipment. In these situations, there is no need to capture equipment identity as a portion of the usage context since the equipment is directly tied to the motion capture element itself. However, as illustrated in FIG. 5, in one or more embodiments it may be common or desirable to change the association between equipment and motion capture elements, and to have this change automatically captured as part of the usage context. This objective can be realized with the current invention by attaching beacons to equipment, as shown in FIG. 5. In this scenario, a stock of bats 500 is available for use, and a stock of motion capture elements 510 is available to be used with any of the bats 500. Each of the bats is equipped with an equipment beacon: illustrative bat 501 is equipped with beacon 503, and illustrative bat 502 is equipped with beacon 504. These beacons 503 and 504 function like the previously described beacons for users, locations, and coaches. An "equipment" beacon group may be defined to distinguish these equipment beacons from other beacons.

A person may then select any bat in step 521, select any motion capture element in step 522 and attach the motion capture element to the bat (in this example onto the knob of the bat), and then measure swings in step 524 using the selected bat 502 with the attached motion capture element 514. The beacon 504 of the selected bat broadcasts its identity to the motion capture element 514, so the motion capture element knows which bat is used. Sensor data 532 is transmitted from motion capture element 514 along with usage context data 530, which includes the identity 531 of the selected bat 502.

As for other elements of the usage context, it is not necessary for an administrator 225 (who may be the user) to perform any manual input 523 to configure the motion capture element with the identity of the bat to which it is attached.

While the ideas herein disclosed has been described by means of specific embodiments and applications thereof, numerous modifications and variations could be made thereto by those skilled in the art without departing from the scope of the invention set forth in the claims.

What is claimed is:

1. A motion capture system that recognizes usage context, comprising:
 a motion capture element configured to be coupled to a piece of equipment, said motion capture element comprising
  a first processor;
  one or more motion sensors each comprising at least one accelerometer or at least one gyroscope coupled to said first processor; and,
  a first network interface coupled to said first processor;
 wherein said motion capture element is configured to
  receive broadcast messages from one or more of a multiplicity of beacons of context items within an environment in which a movement of said piece of equipment occurs,
   each broadcast message of said broadcast messages comprising a group identifier that is used to partition the broadcast messages into groups;
   said multiplicity of beacons comprising one or more of user beacons coupled to a plurality of users;
    location beacons coupled to a plurality of locations; and,
    coach beacons coupled to one or more of
     a plurality of coaches and
     one or more persons other than said plurality of users of the piece of equipment;
  capture motion sensor data from said one or more motion sensors during said movement of said piece of equipment wherein said motion sensor data comprises data from said at least one accelerometer or said at least one gyroscope;
  analyze said broadcast messages and therefrom automatically determine a context of said movement of said piece of equipment,
  wherein said context is automatically determined through a
  partition of said broadcast messages into groups based on the group identifier of said each broadcast message, said groups comprising
   a user group for said user beacons resulting in user beacon messages from said plurality of users;
   a location group for said location beacons resulting in location beacon messages from said plurality of locations; and
   a coach group for said coach beacons resulting in coach beacon messages from said one or more of said plurality of coaches and said one or more persons;
    wherein for said each broadcast message, a distance is calculated between the motion capture element and a beacon of the one or more of a multiplicity of beacons associated therewith; and,
   a selection, within each group of said groups, of a closest beacon of said one or more of a multiplicity of beacons corresponding to each nonempty group of said groups based on said each broadcast message that is associated with a smallest distance that is calculated, to
   automatically determine said context as an identity of each closest beacon of said each group corresponding to each nonempty group,
    such that, for said each nonempty group,
     a first beacon identifier is selected for a user from said plurality of users, a second beacon identifier is selected for a location from said plurality of locations, and
a third beacon identifier is selected for a coach or person from said one or more of the plurality of coaches and said one or more persons;
wherein said context comprises one or more of
said user from said plurality of users who performs said movement of said piece of equipment;
said location from said plurality of locations at or near said piece of equipment when said movement of said piece of equipment occurs;
said coach from said plurality of coaches at or near said piece of equipment when said movement of said piece of equipment occurs; and,
transmit said motion sensor data comprising said data from said at least one accelerometer or said at least one gyroscope and said context over said first network interface; and,
a motion analysis element comprising
a second network interface coupled via a network connection to said first network interface; and
a second processor coupled to said second network interface, said second processor configured to
receive said motion sensor data comprising said data from said at least one accelerometer or said at least one gyroscope and said context including said first beacon identifier, said second beacon identifier and said third beacon identifier of said each closest beacon from said motion capture element via said second network interface;
analyze said motion sensor data comprising said data from said at least one accelerometer or said at least one gyroscope to form one or more motion metrics; and,
associate said one or more motion metrics with said context to associate said one or more motion metrics and said context with one or more of
a user who performs said movement, from said plurality of users that access said piece of equipment,
said location from said plurality of locations,
said coach or said person from said plurality of coaches or said one or more persons,
such that the motion sensor data is appropriately associated with one or more of said user, said location and said coach or one or more persons that is automatically determined via said context from said motion capture element.

2. The motion capture system that recognizes usage context of claim 1, wherein
said motion capture system does not require manual input to configure said motion capture element with any of said user, said location, or said coach.

3. The motion capture system that recognizes usage context of claim 1, wherein
said first network interface comprises a Bluetooth interface;
said multiplicity of beacons comprise Bluetooth beacons; and,
said broadcast messages comprise Bluetooth advertising messages.

4. The motion capture system that recognizes usage context of claim 1, wherein
said one or more motion sensors comprise
a three-axis accelerometer; and,
a three-axis gyroscope.

5. The motion capture system that recognizes usage context of claim 1, wherein
said multiplicity of beacons further comprises
equipment beacons coupled to a plurality of pieces of equipment, wherein said plurality of pieces of equipment comprise said piece of equipment; and,
said context further comprises said piece of equipment.

6. The motion capture system that recognizes usage context of claim 5, wherein
said motion capture system does not require manual input to configure said motion capture element with said piece of equipment.

7. The motion capture system that recognizes usage context of claim 1, further comprising
a motion database coupled to said second processor;
wherein said second processor is further configured to
store said one or more motion metrics and said context associated with said one or more motion metrics in said motion database.

8. The motion capture system that recognizes usage context of claim 7, wherein
said motion database is configured to
accept a query comprising one or more context conditions; and,
return a set of motion metrics associated in said motion database with corresponding context that satisfies said one or more context conditions.

9. The motion capture system that recognizes usage context of claim 1, wherein
said multiplicity of beacons comprises
said user beacons;
said location beacons; and
said coach beacons; and,
said context comprises
said user;
said location; and
said coach.

10. The motion capture system that recognizes usage context of claim 9, wherein
said first network interface comprises a Bluetooth interface;
said multiplicity of beacons comprise Bluetooth beacons;
said broadcast messages comprise Bluetooth advertising messages;
said one or more motion sensors comprise
a three-axis accelerometer; and
a three-axis gyroscope;
each broadcast message of said broadcast messages comprises a group identifier;
said analyze said broadcast messages to determine a context of said movement of said piece of equipment comprises:
partition said broadcast messages into groups based on said group identifier, said groups comprising
a user group;
a location group;
a coach group;
select a closest beacon corresponding to each nonempty group of said groups;
determine said context as an identity of each closest beacon corresponding to each nonempty group.

11. The motion capture system that recognizes usage context of claim 10, further comprising a motion database coupled to said second processor;
wherein
    said second processor is further configured to
        store said one or more motion metrics and said context associated with said one or more motion metrics in said motion database; and
    said motion database is configured to
        accept a query comprising one or more context conditions; and,
        return a set of motion metrics associated in said motion database with corresponding context that satisfies said one or more context conditions.

\* \* \* \* \*